US010662706B2

(12) United States Patent
Heffernan

(10) Patent No.: US 10,662,706 B2
(45) Date of Patent: May 26, 2020

(54) WORKSTATION

(71) Applicant: Heff Industries Inc., Longmont, CO (US)

(72) Inventor: Matthew Paul Heffernan, Estes Park, CO (US)

(73) Assignee: Heff Industries Inc., Longmont, CO (US)

( * ) Notice: Subject to any disclaimer, the term of this patent is extended or adjusted under 35 U.S.C. 154(b) by 170 days.

(21) Appl. No.: 15/280,672

(22) Filed: Sep. 29, 2016

(65) Prior Publication Data

US 2017/0089135 A1 Mar. 30, 2017

Related U.S. Application Data

(60) Provisional application No. 62/234,190, filed on Sep. 29, 2015, provisional application No. 62/252,007, filed on Nov. 6, 2015.

(51) Int. Cl.

| | |
|---|---|
| ***E06C 7/14*** | (2006.01) |
| ***E04G 5/00*** | (2006.01) |
| ***F16M 13/02*** | (2006.01) |
| ***B25H 3/06*** | (2006.01) |

(52) U.S. Cl.
CPC ................. *E06C 7/14* (2013.01); *B25H 3/06* (2013.01); *E04G 5/003* (2013.01)

(58) Field of Classification Search
CPC .................................. B25H 3/06; E04G 5/003
See application file for complete search history.

(56) References Cited

U.S. PATENT DOCUMENTS

| | | | | |
|---|---|---|---|---|
| 3,807,319 | A | | 4/1974 | Steanson, Jr. |
| D268,130 | S | | 3/1983 | Easton |
| D279,384 | S | | 6/1985 | Evenson |
| D280,290 | S | | 8/1985 | Bakus |
| 4,533,018 | A | * | 8/1985 | Tyson ........................ E06C 7/16 182/121 |
| D280,669 | S | | 9/1985 | Lammeke |
| D289,247 | S | | 4/1987 | Wang |
| D299,687 | S | | 2/1989 | Handler et al. |
| 4,874,147 | A | | 10/1989 | Ory et al. |
| D306,365 | S | | 2/1990 | Brown et al. |
| D309,687 | S | | 8/1990 | Embree et al. |
| D318,985 | S | | 8/1991 | Szablak et al. |
| D330,219 | S | | 10/1992 | Carlson et al. |
| D332,553 | S | | 1/1993 | Giugiaro |
| D335,978 | S | | 6/1993 | Grahn et al. |
| D352,202 | S | | 11/1994 | Campbell et al. |
| D352,203 | S | | 11/1994 | Campbell et al. |

(Continued)

OTHER PUBLICATIONS

Heff Industries, 24" Big Mule Workstation, Jul. 26, 2016, <https://heffindustries.com/store/#!/24-Big-Mule-Workstation/p/55583343/category=0>.

*Primary Examiner* — John C Hong
(74) *Attorney, Agent, or Firm* — Stinson LLP

(57) ABSTRACT

A workstation for supporting work articles at an elevated position comprising a base plate; a workstation mount connected to the base plate and configured to selectively mount the workstation on one of a ladder and a railing; and at least one tray sized and arranged for being inserted into the at least one tray opening and thereby installed in the workstation, the at least one tray being selectively removable from the tray opening to separate the tray from the base plate.

6 Claims, 22 Drawing Sheets

(56) References Cited

U.S. PATENT DOCUMENTS

| | | | |
|---|---|---|---|
| 5,419,265 A | 5/1995 | Zimmerman | |
| D369,469 S | 5/1996 | Gregory | |
| D378,726 S | 4/1997 | Dunn | |
| D396,162 S | 7/1998 | Mutti | |
| D396,953 S | 8/1998 | Iversen et al. | |
| D396,955 S | 8/1998 | Iversen et al. | |
| D396,956 S | 8/1998 | Iversen et al. | |
| 5,850,956 A | 12/1998 | Hayward, Jr. | |
| D407,254 S | 3/1999 | DeBooth | |
| D411,509 S | 6/1999 | Schlegel | |
| 5,918,550 A | 7/1999 | Weir et al. | |
| 5,941,344 A | 8/1999 | Spadaro | |
| 5,967,259 A | 10/1999 | Williams | |
| D419,772 S | 2/2000 | Williams | |
| D422,141 S | 4/2000 | Dembicks | |
| D438,029 S | 2/2001 | Brey et al. | |
| D447,818 S | 9/2001 | Weber | |
| 6,474,244 B1 | 11/2002 | Karpinski | |
| D484,701 S | 1/2004 | Fabregas | |
| 6,842,922 B2 | 1/2005 | Smeed | |
| D508,774 S | 8/2005 | McAndrew | |
| D510,481 S | 10/2005 | Hodgson | |
| 7,080,416 B1 | 7/2006 | Portnell | |
| 7,264,084 B1 | 9/2007 | Switzer | |
| D554,474 S | 11/2007 | Miller | |
| D562,641 S | 2/2008 | Dretzka | |
| D571,188 S | 6/2008 | Brassard | |
| D577,489 S | 9/2008 | Debowiecki | |
| D605,896 S | 12/2009 | Zalewski et al. | |
| D617,990 S | 6/2010 | Liao | |
| D634,541 S | 3/2011 | Gutierrez | |
| D659,479 S | 5/2012 | Peck | |
| D661,190 S | 6/2012 | Fahy | |
| D676,534 S | 2/2013 | Lam | |
| D685,110 S | 6/2013 | Lusin et al. | |
| D693,125 S | 11/2013 | Bell | |
| D711,196 S | 8/2014 | May et al. | |
| D727,623 S | 4/2015 | Nickell | |
| D746,643 S | 1/2016 | Kraemer | |
| D766,664 S | 9/2016 | Wilson et al. | |
| D785,406 S | 5/2017 | Wansink | |
| 9,714,542 B1 | 7/2017 | Harez | |
| D795,605 S | 8/2017 | Heffernan | |
| D810,321 S | 2/2018 | Heffernan | |
| D844,990 S | 4/2019 | Liao | |
| 2002/0166724 A1* | 11/2002 | Kvam | E06C 7/14 182/129 |
| 2005/0056486 A1* | 3/2005 | Butler | E06C 7/14 182/129 |
| 2005/0258002 A1* | 11/2005 | Sabo | E06C 7/14 182/129 |
| 2005/0263468 A1 | 12/2005 | Wanda | |
| 2009/0032662 A1* | 2/2009 | Parrott | E06C 7/14 248/238 |
| 2013/0112502 A1* | 5/2013 | Oliver | E06C 7/14 182/129 |
| 2013/0186310 A1 | 7/2013 | Lymberis | |
| 2017/0089135 A1 | 3/2017 | Heffernan | |

* cited by examiner

WORKSTATION

CROSS-REFERENCE TO RELATED APPLICATIONS

This application claims priority to U.S. Provisional Patent Application Ser. No. 62/234,190, filed Sep. 29, 2015, and entitled WORKSTATION. This application also claims priority to U.S. Provisional Patent Application Ser. No. 62/252,007, filed Nov. 6, 2015, and entitled WORKSTATION. Each of these applications is hereby incorporated by reference in its entirety and for all purposes.

FIELD

The present disclosure generally relates to workstations for supporting and organizing tools, loose work pieces, materials, etc., on a lift, ladder, scaffold, etc.

BACKGROUND

Lifts and scaffolds elevate workers to conduct work in high up locations. To prevent workers from having to frequently load and unload from a lift or scaffold, it is desirable for the worker to have all necessary equipment and materials at the elevated position. It can be difficult to keep equipment organized and secure while working on a lift or scaffold. Similarly, it can be difficult to keep equipment organized and secure while working on a ladder. To prevent workers from having to frequently load and unload from a ladder, it is desirable for the worker to have all necessary equipment and materials on the ladder.

SUMMARY

Briefly, therefore, the invention is directed to a workstation for supporting work articles at an elevated position comprising a base plate having a top, a bottom, and a thickness extending therebetween, the base plate defining a plurality of tool holes extending through the thickness of the base plate, the tool holes each being shaped and arranged for receiving a narrow end portion of a tool therethrough such that a wide end portion of the respective tool is supported on the top of the base plate, the base plate further defining at least one tray opening extending through the thickness of the base plate; a workstation mount connected to the base plate and configured to selectively mount the workstation on one of a ladder and a railing; and at least one tray sized and arranged for being inserted into the at least one tray opening and thereby installed in the workstation, the at least one tray being selectively removable from the tray opening to separate the tray from the base plate.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Referring to FIGS. 1-8, one embodiment of a workstation configured for organizing and retaining tolls, materials, and equipment at an elevated position on a lift or scaffold is generally indicated at 10. As will be appreciated, the workstation 10 is configured to be mountable on a railing R or other support member of various scaffolds and lifts and to organize and retain tools, materials, and other equipment thereupon so that a worker can readily access what is needed while working at an elevated position.

The workstation 10 includes a base plate 12 having a top surface and a bottom surface spaced apart along a thickness T1. In the illustrated embodiment, the base plate 12 is formed from plywood with a powder-coated sheet metal skin that is screwed into the plywood. Other base plates may have other constructions without departing from the scope of the invention.

The base plate 12 defines a plurality of holes 14A-14D for receiving tools, work pieces, materials, etc. Throughout this disclosure, the end of the base plate 12 that is closest to the tool receiving holes 14A-14D is referred to as the front end of the workstation 10, and the opposite end of the base plate is referred to as the rear end of the workstation. It is understood that the orientation of the workstation 10 could vary in use. The holes extend through the thickness T1 of the base plate 12. In the illustrated embodiment, the base plate 12 defines eight holes 14A-14D that are spaced apart in a line along a front end portion of the base plate. The holes include two large circular end holes 14A at opposite ends of the line of holes, two wide slots 14B inboard of and adjacent to the end holes, two medium-sized circular holes 14C inboard of and adjacent to the slots, and two small-sized circular holes 14D inboard of and adjacent to the medium-sized holes. The narrow ends of tools or other equipment can be inserted into the holes 14A-14D so that the enlarged or wide ends thereof engage the top surface of the base plate 12. The base plate 12 thereby separately holds the equipment in place on the workstation 10. Other workstations can define other arrangements of tool receiving holes without departing from the scope of the invention.

Figure 9:
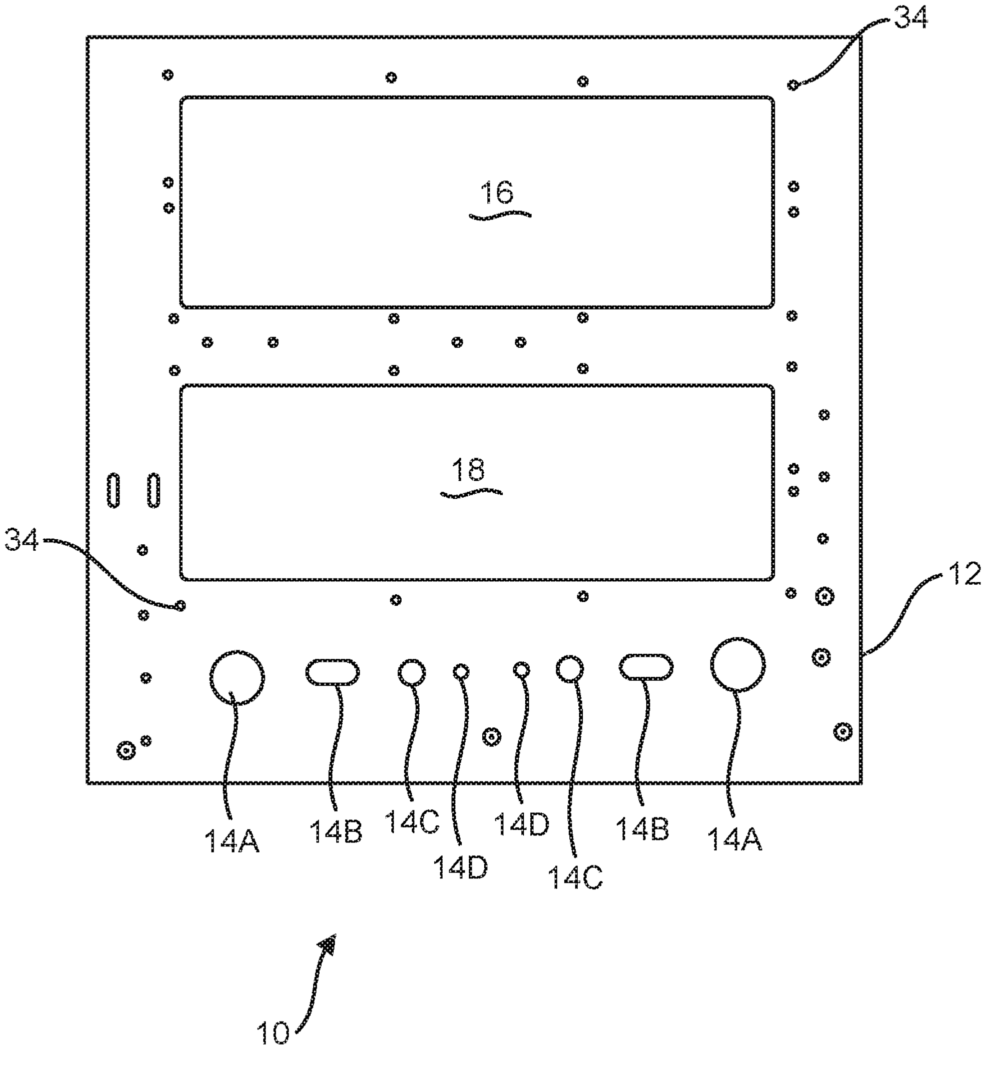
FIG. 9 is a top plan view of a base plate of the work station with trays of the workstation removed.

Referring to FIG. 9 the base plate 12 also defines first and second tray openings 16, 18 that extend through the thickness T1 of the base plate. The tray openings 16, 18 are each sized and arranged for receiving one or more trays, such as the first and second trays 26, 28 shown in FIGS. 1-8 and described in further detail below. When the tray openings 16, 18 receive the trays 26, 28, the trays are supported on the base plate 12 as explained in further detail below. In the illustrated embodiment, the tray openings 16, 18 are about the same size so that they trays 26, 28 may be interchangeably received in either of the two openings. In other embodiments, tray openings may have different sizes without departing from the scope of the invention. In the illustrated embodiment, the tray openings 16, 18 are centered between the sides of the base plate 12. One tray opening 16 is located near a rear end of the base plate 12, and the other tray opening 18 is centered between the rear tray opening and the line of holes 14A-14D.

Figure 10:
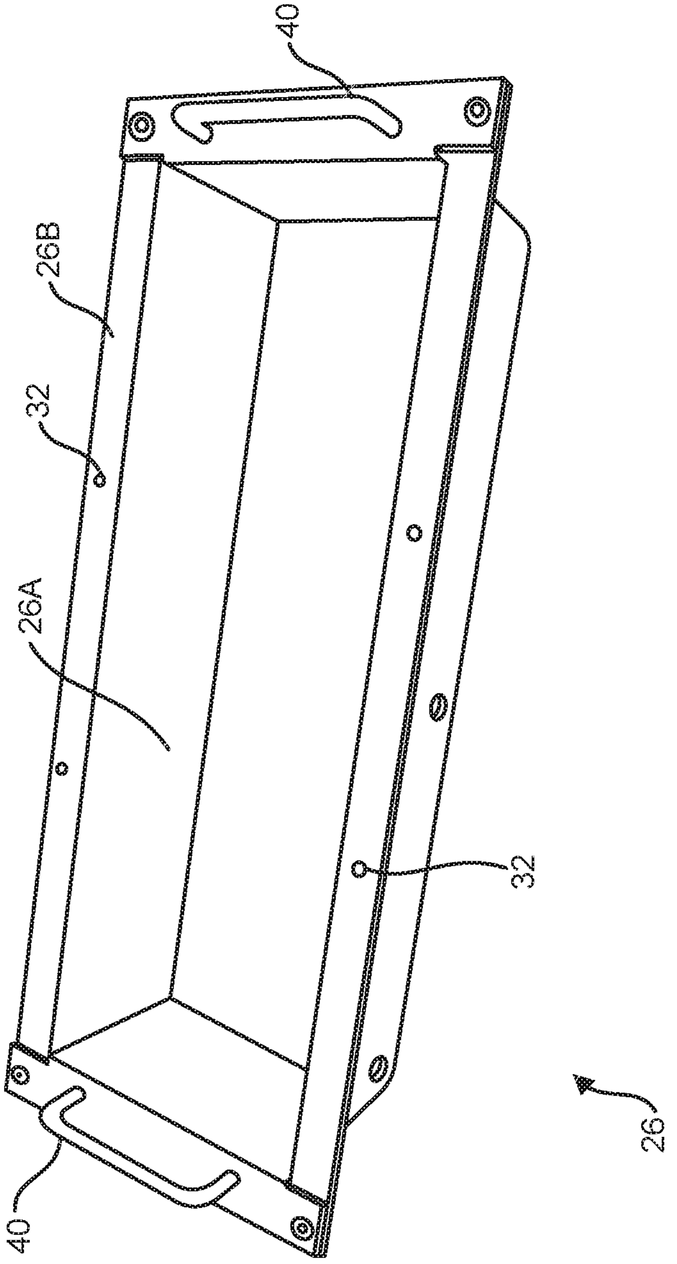
FIG. 10 is a perspective of a tray of the workstation.

Referring to FIGS. 1-8, the two large trays 26, 28 are received in the tray openings 16, 18. Referring to FIG. 10, the first tray 26 will now be described in detail. It is understood that the illustrated second tray 28 has a shallower depth than the first tray; but in all other aspects, the second tray 28 may have the same features and construction as the first tray 26. The tray 26 is formed from rigid sheet metal that is folded to shape and powder coated with a protective covering. The tray has a receptacle portion 26A that defines in interior cavity and a flange portion 26B that extends outward from the top of the receptacle portion. When the tray 26 is received in either of the openings 16, 18, the flange portion 26B rests on the top of the base plate 12 and the receptacle portion 26A extends downward through the respective opening. To fasten the tray 26 to the base plate, screws 30 (FIG. 1) may be threaded through holes 32 (FIG. 10) in the flange portion 26B into threaded holes 34 (FIG. 9) that are formed in the base plate 12 about the perimeter of the respective opening 16, 18 in alignment with the flange holes. In the illustrated embodiment, handles 40 are attached to the flange portion 26B of the tray 26 to allow the tray to be easily moved into and out of one of the tray openings 16, 18.

Figure 1:
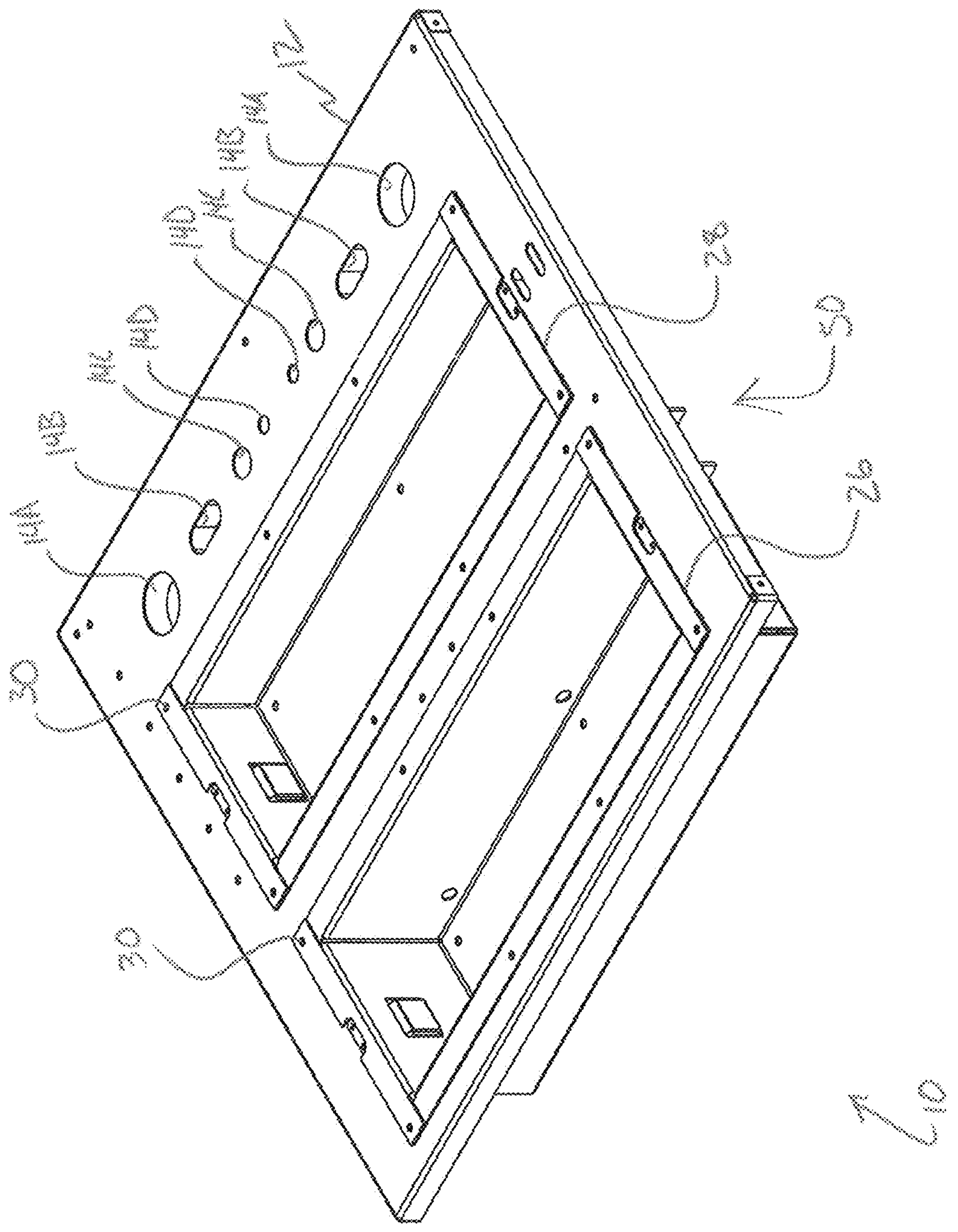
FIG. 1 is top, left, and rear perspective of a workstation.
Figure 2:
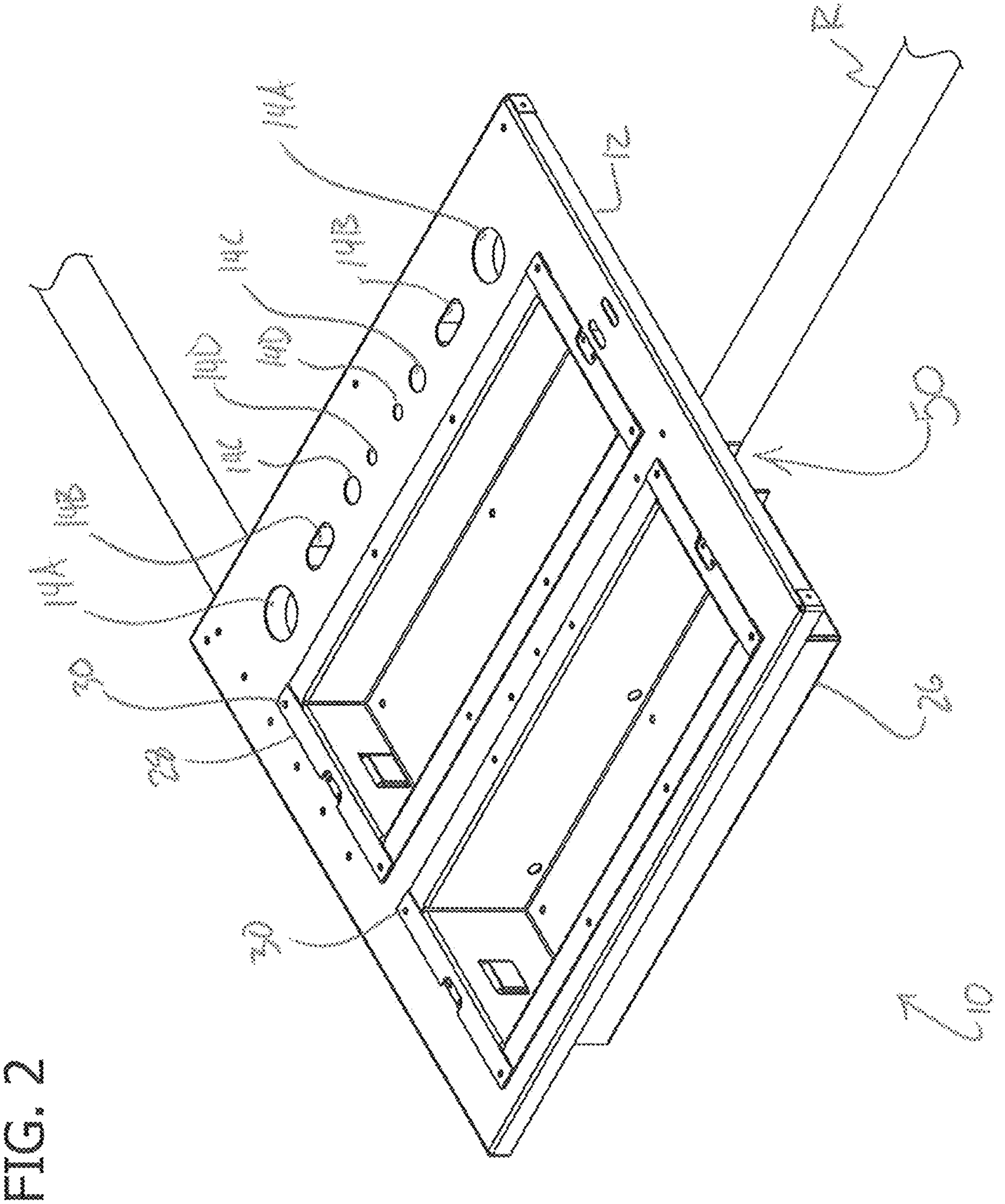
FIG. 2 is perspective of the workstation similar to FIG. 1, illustrating the workstation mounted on a railing.
Figure 3:
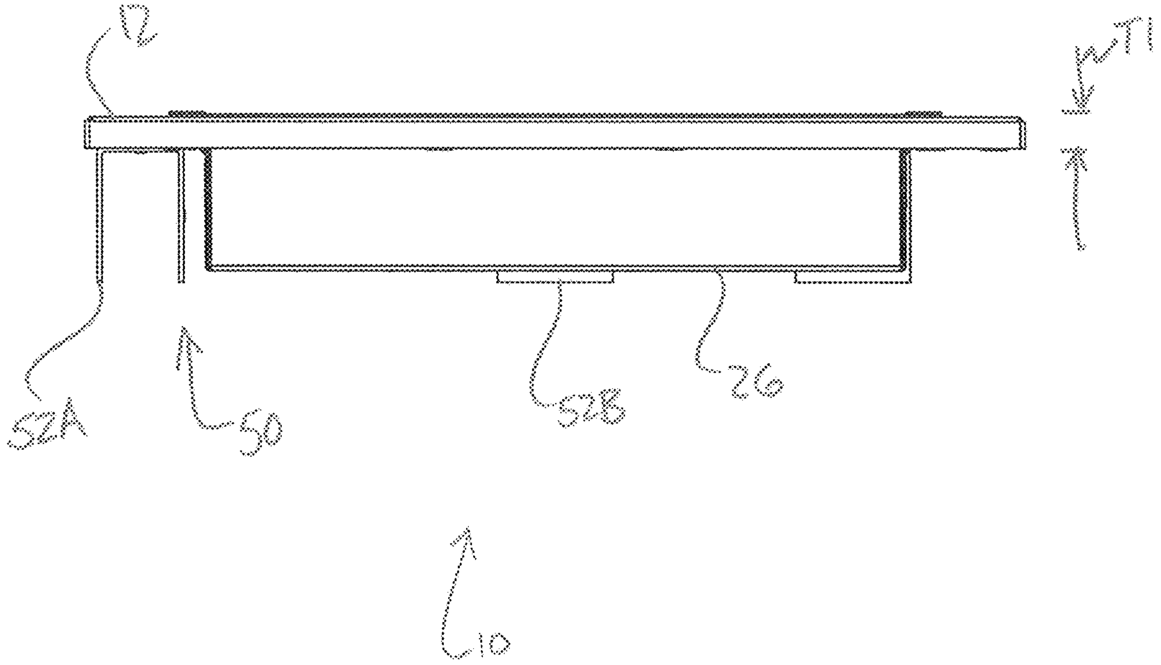
FIG. 3 is a rear elevation of the workstation.
Figure 4:
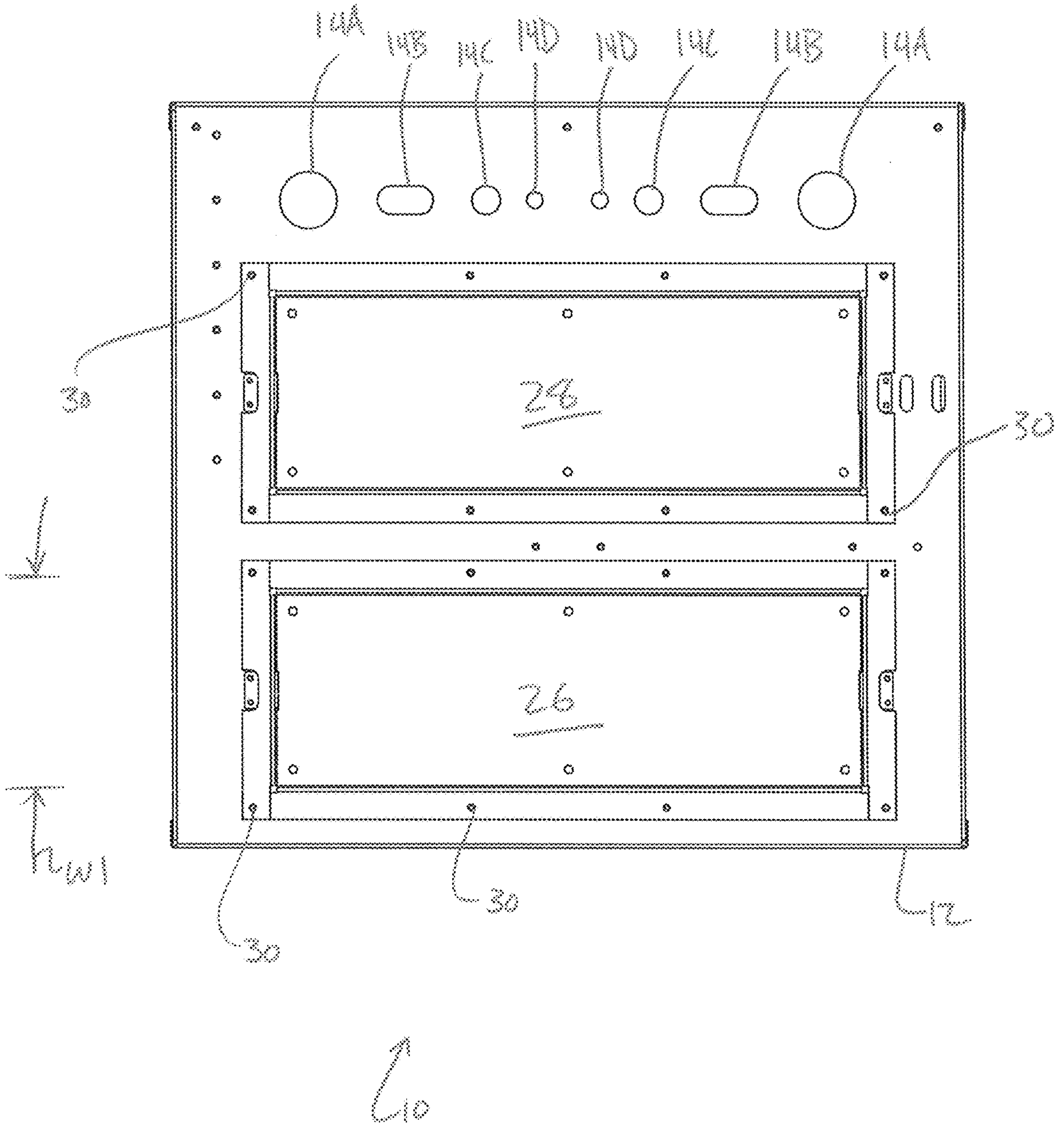
FIG. 4 is a top plan view of the workstation.
Figure 5:
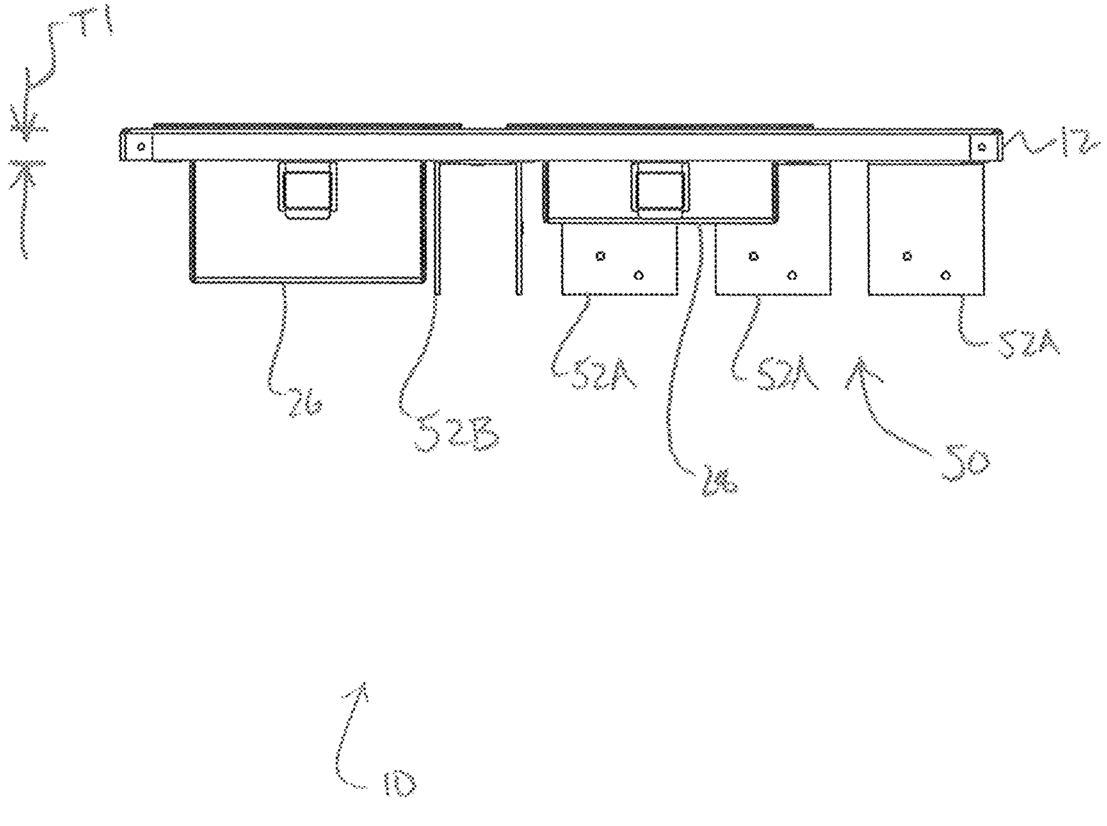
FIG. 5 is a left side elevation of the workstation.
Figure 6:
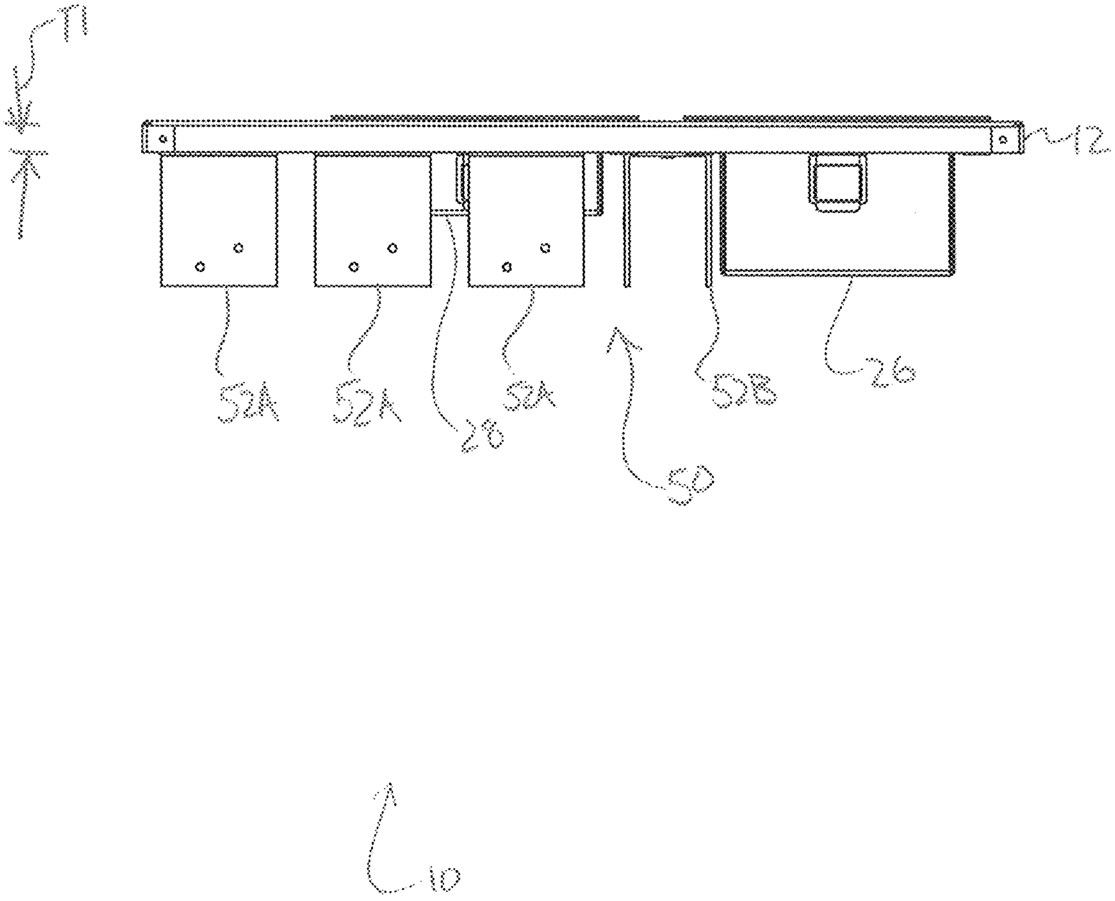
FIG. 6 is a right side elevation of the workstation.
Figure 7:
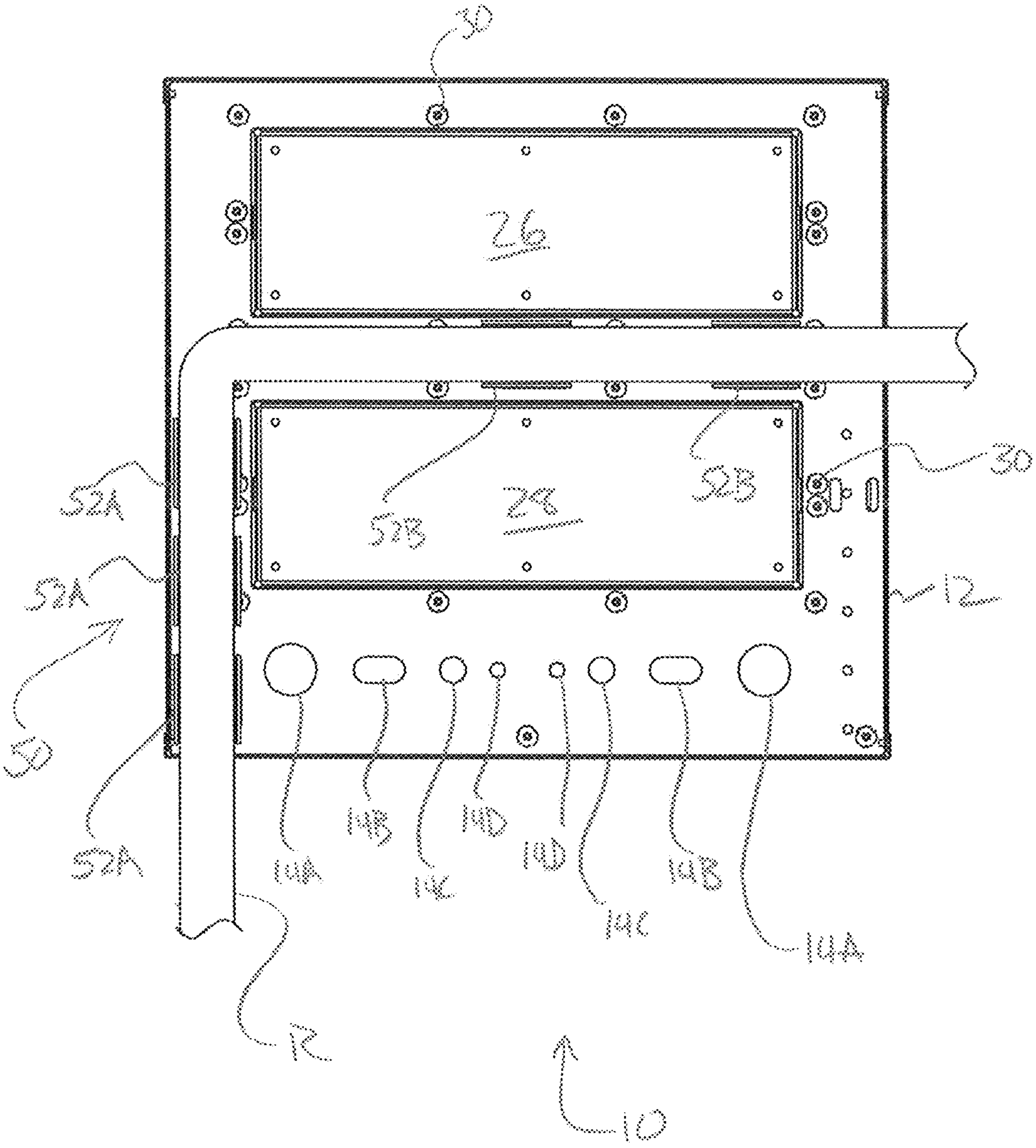
FIG. 7 is a bottom plan view of the workstation mounted on the railing.
Figure 8:
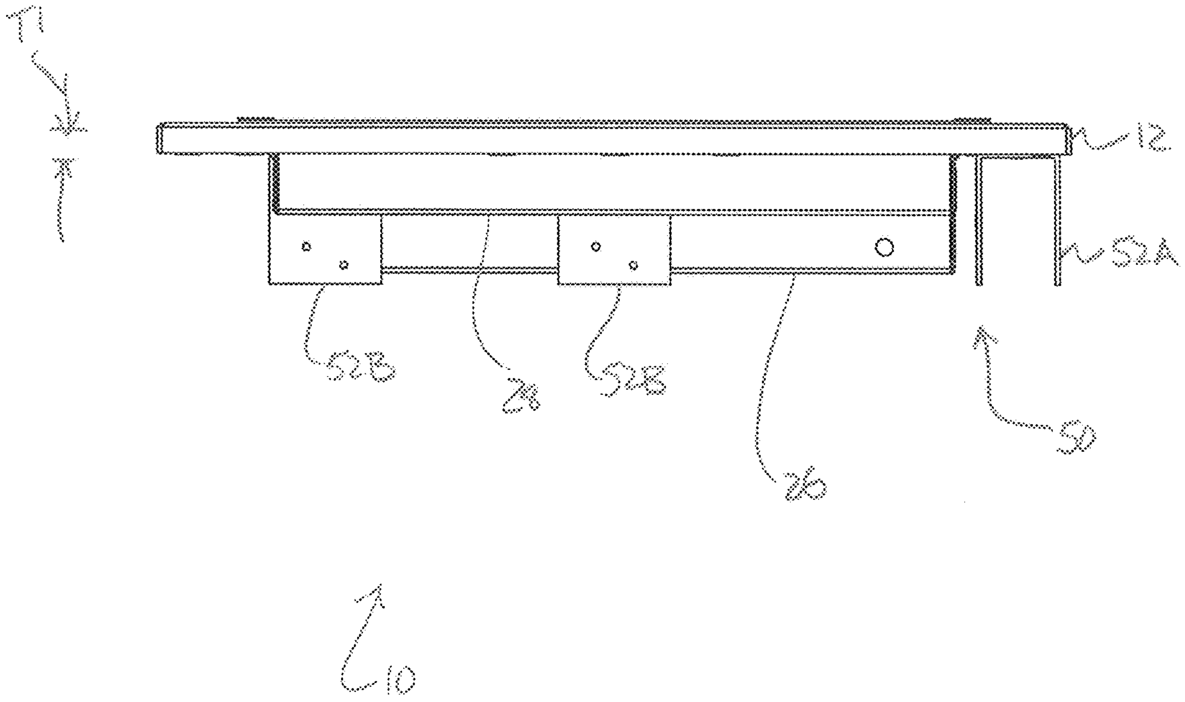
FIG. 8 is a front elevation of the workstation.
Figure 11:
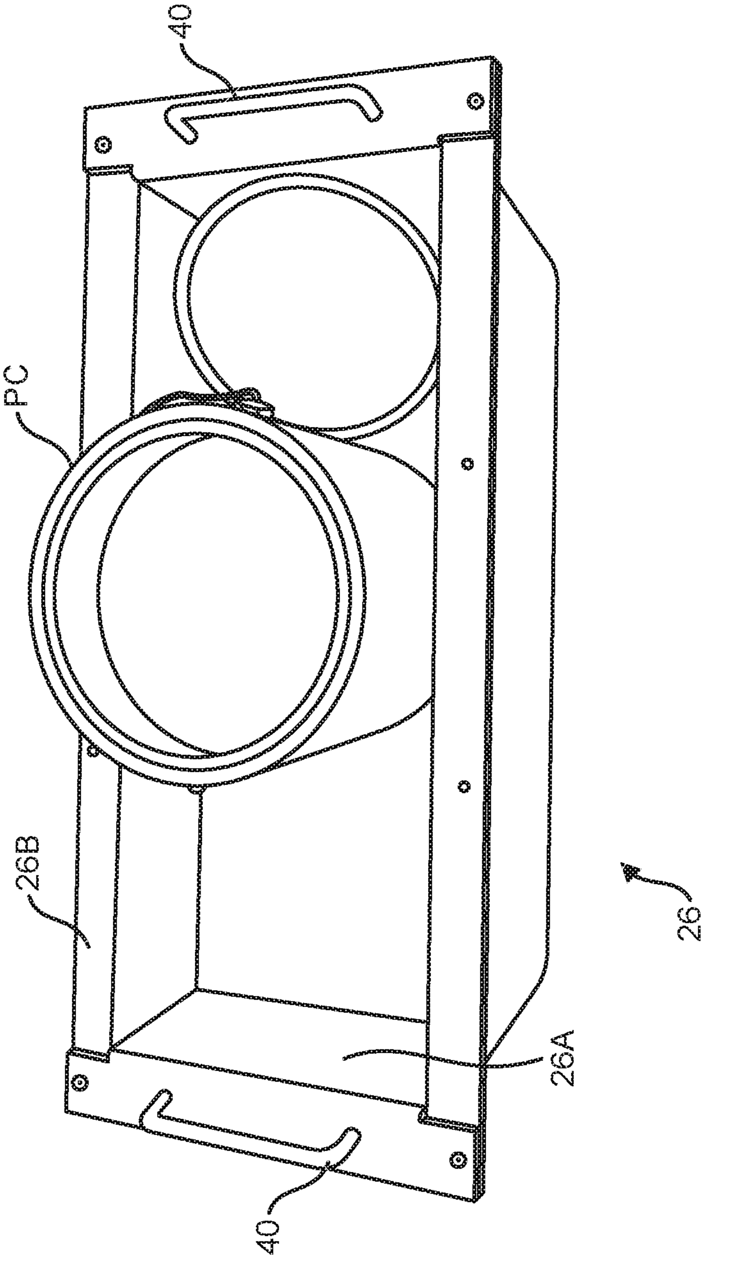
FIG. 11 is a perspective of a tray of the workstation receiving a one-gallon paint can.

As shown in FIG. 4, the receptacle portion 26A has a width W1. In one or more embodiments, the width W1 of the receptacle portion 26A is sized so that the tray can receive one or more items therein such that the internal cavity of the tray 26 is substantially free of gaps between the item and the front and rear walls of the receptacle portion. For example, as shown in FIG. 11, in the illustrated embodiment, the width W1 of the cavity of the tray 26 is sized and arranged so that the tray receives a standard one-gallon paint can PC such that the internal cavity is substantially free of gaps between the paint can and the front and rear walls of the receptacle portion 26A. Thus, the illustrated receptacle portion 26A has a width W1 of about 6 inches. The sizing of the width W1 of the receptacle portion 26A minimizes tipping of the paint can PC when received in the tray 26.

In one or more embodiments, the workstation 10 includes one or more additional trays—that is, trays in addition to trays 26, 28—such that the wokrstation includes a greater number of trays than tray openings 16, 18. The additional trays can have different configurations (e.g., different cavity dimensions, such as different depths; different materials, such as being formed from a dielectric or insulating material; different storage features, such as built in liquid containment vessel(s), retainer formations for securing predetermined items to the tray; etc.) to allow the user to reconfigure the workstation as necessary for a particular job. In an exemplary method of using the workstation 10, the user prefills the trays with task-specific items. For example, the user prefills one tray with paint application articles, another with surface repair articles, another with plumbing articles, another with electrical repair articles, another with mechanical systems repair articles, another with masonry articles, etc. Prior to use of the workstation 10 on a lift or scaffold, the user removes unwanted trays from the base plate 12 and inserts into the tray openings 16, 18 the trays that are filled with articles suited for the task(s) about to be performed. This process can be repeated each time the user loads the lift or scaffold so that the articles needed for the task(s) to be performed at elevation are always at hand. It can be seen that providing a greater number of trays than tray openings provides the user storage flexibility for having prefilled trays at the ready for various work tasks that may arise.

Figure 12:
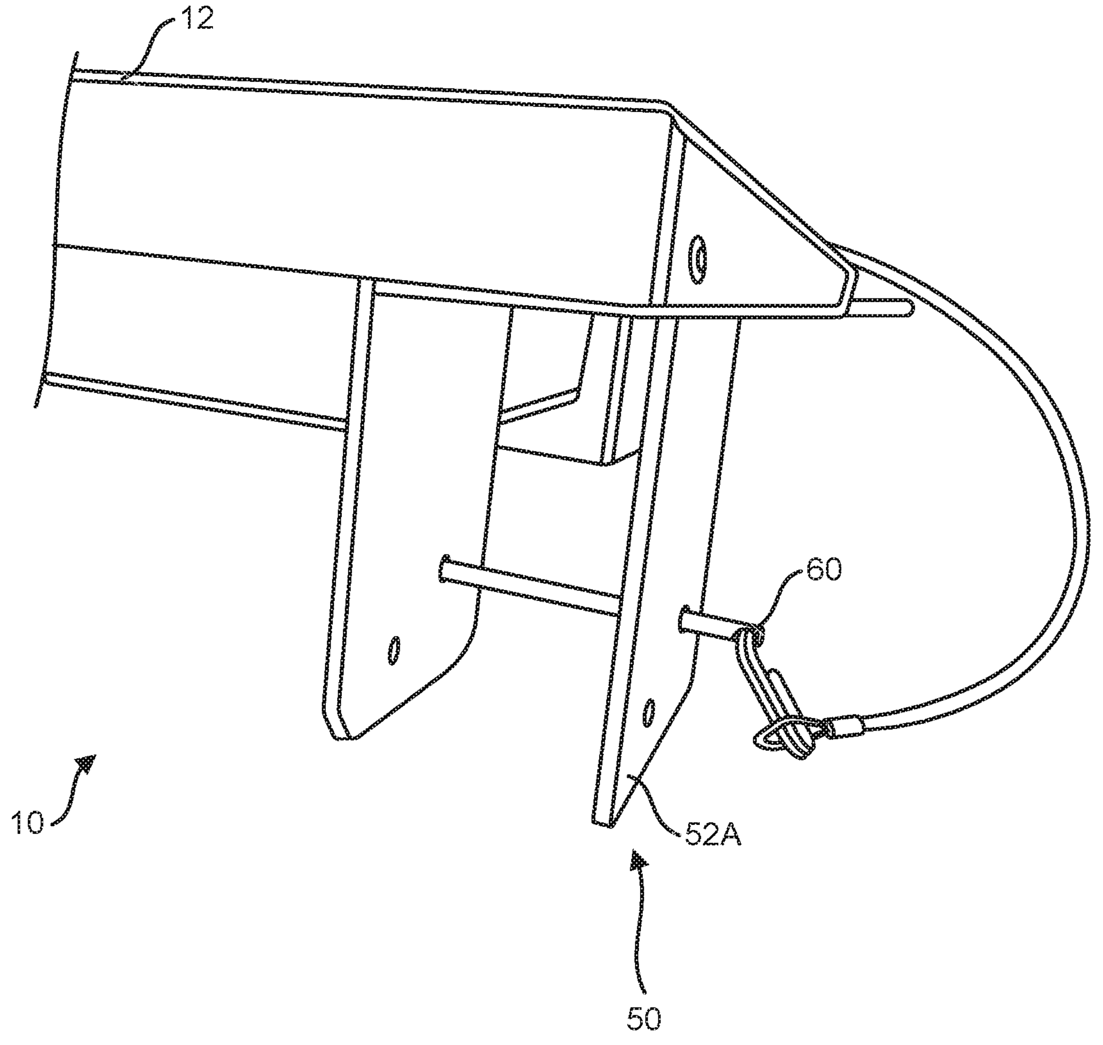
FIG. 12 is an enlarged fragmentary perspective of a portion of the workstation illustrating a pin received in a C-channel bracket of a mount for mounting the workstation on a railing.

Referring to FIGS. 5-8, the illustrated workstation 10 includes a workstation mount, generally indicated at 50, which is configured to mount the work station on the railing R of a lift, scaffold, or the like. The mount 50 includes two rows of C-channel mounting brackets 52A, 52B. In the illustrated embodiment, each row includes multiple, spaced apart brackets 52A, 52B, but each row may also include only a single mounting bracket without departing from the scope of the invention. The mounting brackets 52A, 52B extend downward from the bottom surface of the base plate 12. One row of mounting brackets 52A extends in a line along one side of the base plate 12, and the other row of mounting brackets 52B extends in a perpendicular line between the tray openings 16, 18. Thus the mounting brackets 52B are oriented perpendicular to the mounting brackets 52A. The brackets 52A, 52E are oriented so the open end of the C-channel faces down. The bases of the C-channel brackets 52A, 52B are screwed to the base plate 12. In use the brackets 52A, 52B are installed over a perpendicular joint of a railing R. The C-channel brackets 52A receive one section of the railing R and the C-channel brackets 52B receive a perpendicular section of the railing. The weight of the workstation 10 is thereby supported on the railing R. The brackets prevent the workstation 10 from becoming unmounted unless the workstation is lifted off of the railing R. As shown in FIG. 12, a pin 60 may be inserted through a bracket 52A below the railing member R to prevent the workstation 10 from being lifted up. To remove the workstation 10 from the railing R, the pin 60 must first be removed from the bracket 52A.

To use the workstation 10, a user loads the trays 26, 28 with work articles and places any desired tools into the tool holes 14A-14D. As explained above, the user may select from prefilled trays for installation in the workstation 10 in some embodiments. Once the workstation 10 is loaded with the desired trays and work articles, the user can mount the workstation on the railing R of the lift or scaffold. The user inserts respective segments of the railing R into the channels of the C-channel brackets 52A, 52B and releases the workstation so that it comes to rest on the railing. To secure the workstation 10 on the railing R, the user inserts the pin 60 into the C-channel bracket 52A underneath the railing segment. Once secured, the workstation 110 positions the work articles at the elevated position of the lift or scaffold so that the user does not need to descend from the lift or scaffold in order to obtain the necessary work articles.

Referring to FIGS. 13-20, another workstation suitable for supporting work articles at an elevated position on a ladder L is generally indicated at 110. The workstation 110 includes a base plate 112 having a top surface and a bottom surface spaced apart along a thickness T2. As above, the illustrated base plate 112 is formed from plywood with a powder-coated sheet metal skin that is screwed into the plywood, though other materials and constructions may also be used without departing from the scope of the invention.

The base plate 112 defines a plurality of holes 114A-114D for receiving tools, workpieces, materials, etc. Throughout this disclosure, the end of the base plate 112 that is closest to the tool receiving holes 114A-114D is referred to as the front end of the workstation 110, and the opposite end of the base plate is referred to as the rear end of the workstation. It is understood, however, that the orientation of the workstation 110 may vary in use. Each of the holes 114A-114D extends through the thickness T2 of the base plate 112. In the illustrated embodiment, the base plate defines four holes 114A-114D that are spaced apart in a line along a left side portion of the base plate 112 and four holes 114A-114D that are spaced apart in a line along a right side portion of the base plate. In each line, the four holes include one large circular hole 114A about midway between the front and rear ends of the base plate; one elongate slot 114B adjacent to the large circular hole and closer to the front end; a medium-sized circular hole 114C adjacent to the elongate slot and closer to the front end; and one small-sized circular hole 114D closest to the front end. The narrow ends of tools or other equipment can be inserted into the holes 114A-114D so that the enlarged or wide ends thereof engage the top surface of the base plate. The base plate 112 thereby separately holds the equipment in place using the holes 114A-114D.

Figure 21:
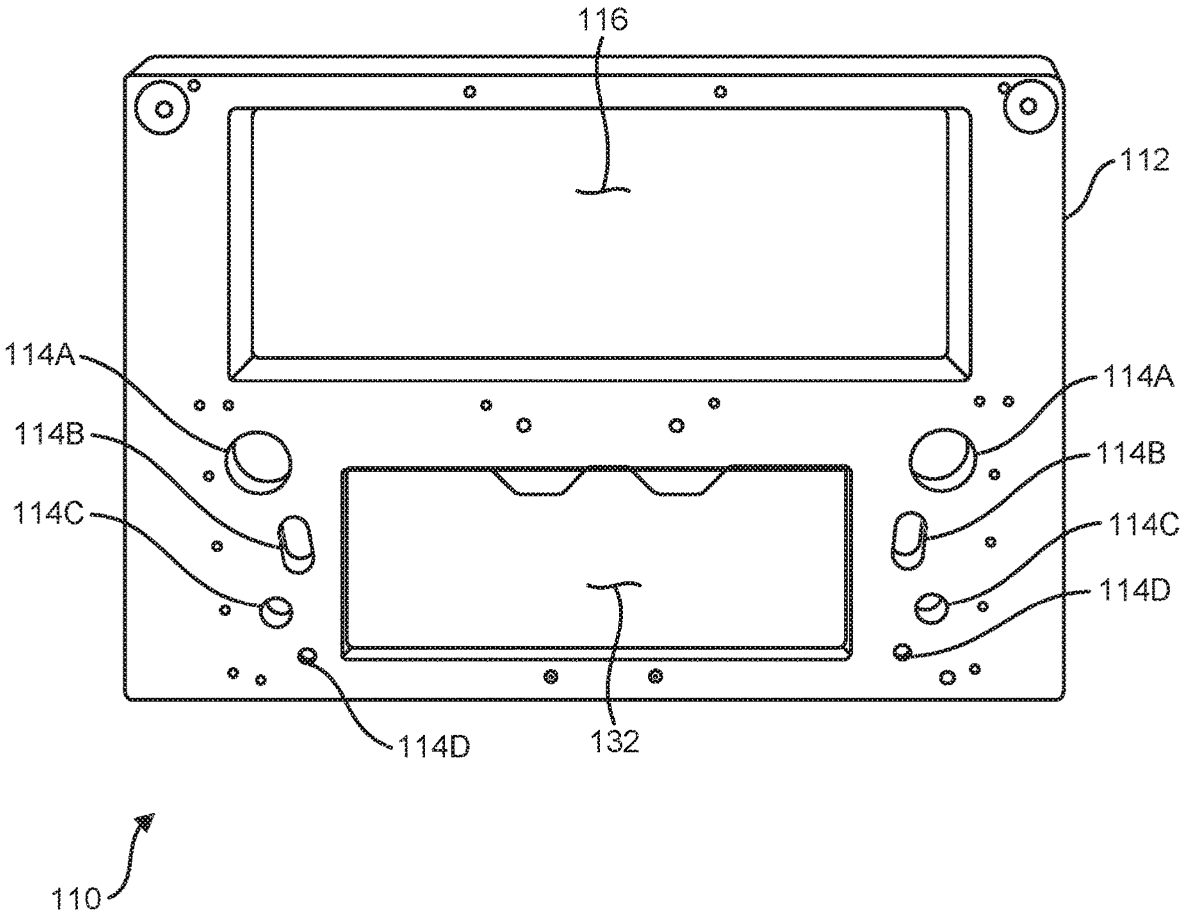
FIG. 21 is a top plan view of the workstation of FIG. 13 with a tray thereof removed.

Referring to FIG. 21, the illustrated base plate 112 defines a single tray opening 116 that extends through the thickness T2 of the base plate. The tray opening 116 is sized and arranged for receiving a tray, such as the tray 126 shown in FIGS. 13-21. Suitably, the tray 126 may have any of the features of the tray 26 as set forth above. When the tray opening 116 receives the tray 126 as shown in FIG. 14, the tray is supported on the base plate 112 such that a receptacle portion 126 of the tray extends through the opening and a flange portion 126B is supported on the top of the base plate. The flange portion 1266 may be screwed to the base plate 112 to fasten the tray 126 in place. The tray opening 116 is located near the rear end of the base plate 112 and is centered between the sides of the base plate.

Figure 13:
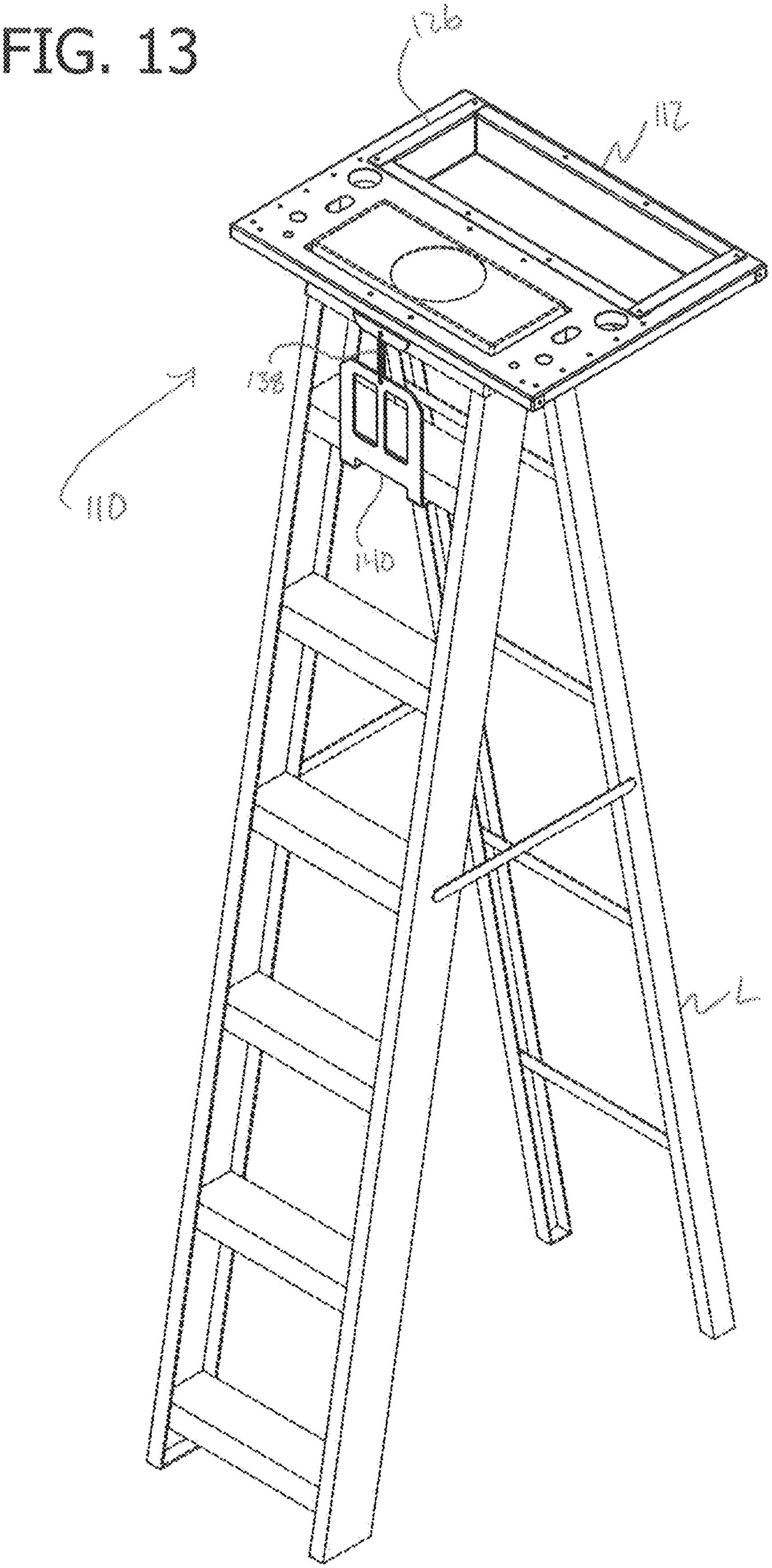
FIG. 13 is a perspective of another workstation mounted on a ladder.
Figure 14:
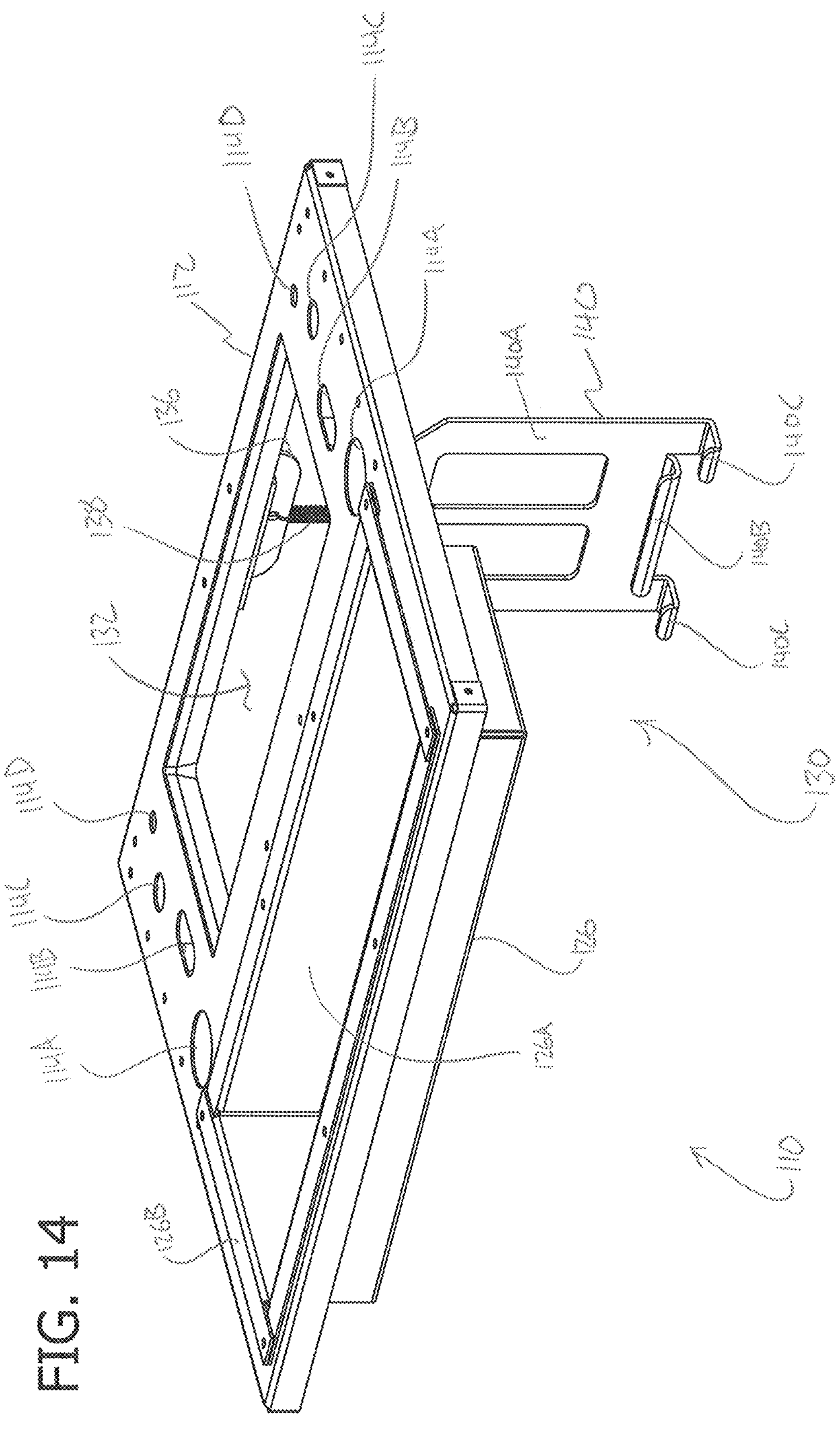
FIG. 14 is a top, left, and rear perspective of the workstation of FIG. 13.
Figure 15:
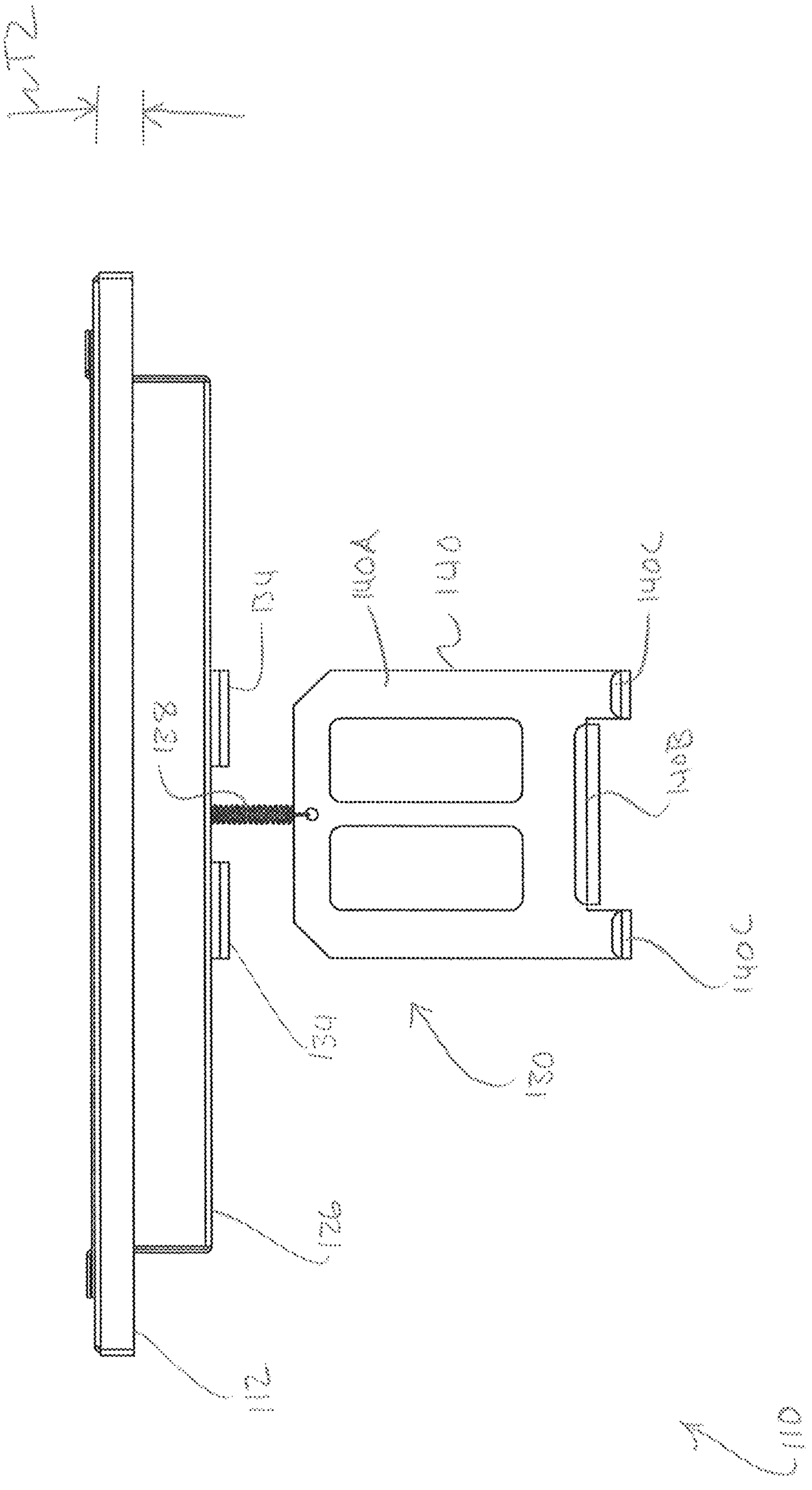
FIG. 15 is a rear elevation of the workstation of FIG. 13.
Figure 16:
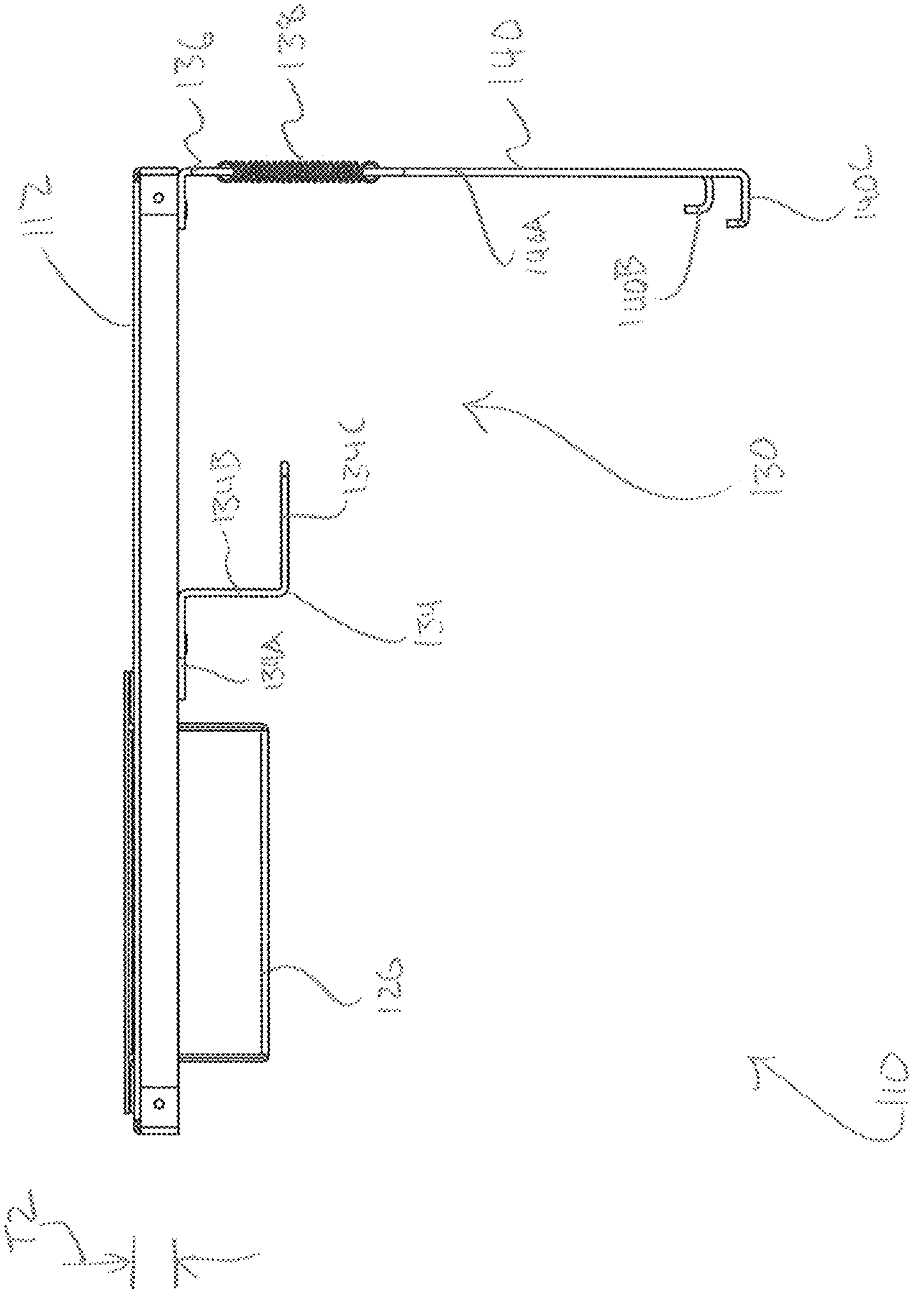
FIG. 16 is a left side elevation of the workstation of FIG. 13.
Figure 17:
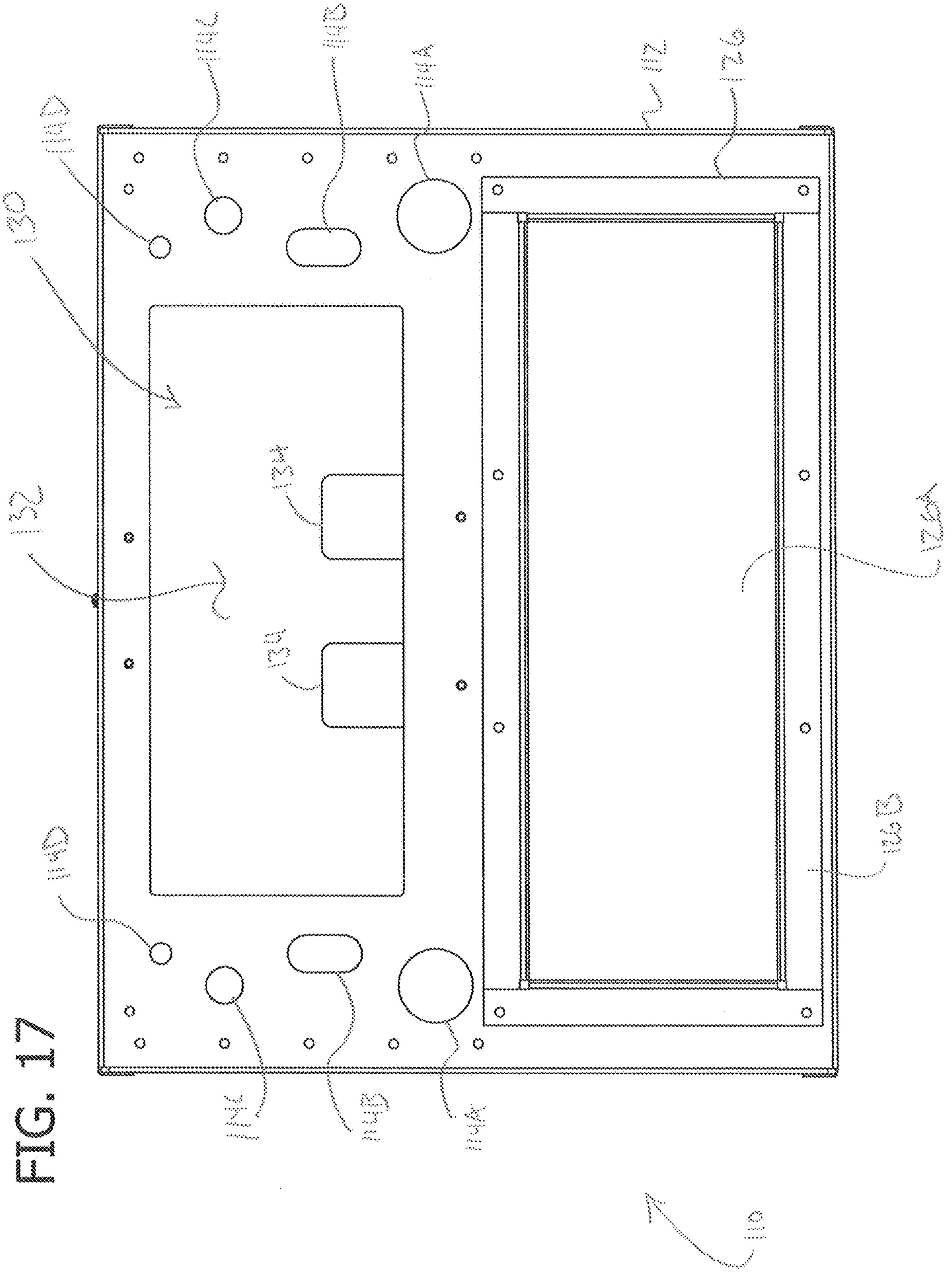
FIG. 17 is a top plan view of the workstation of FIG. 13.
Figure 18:
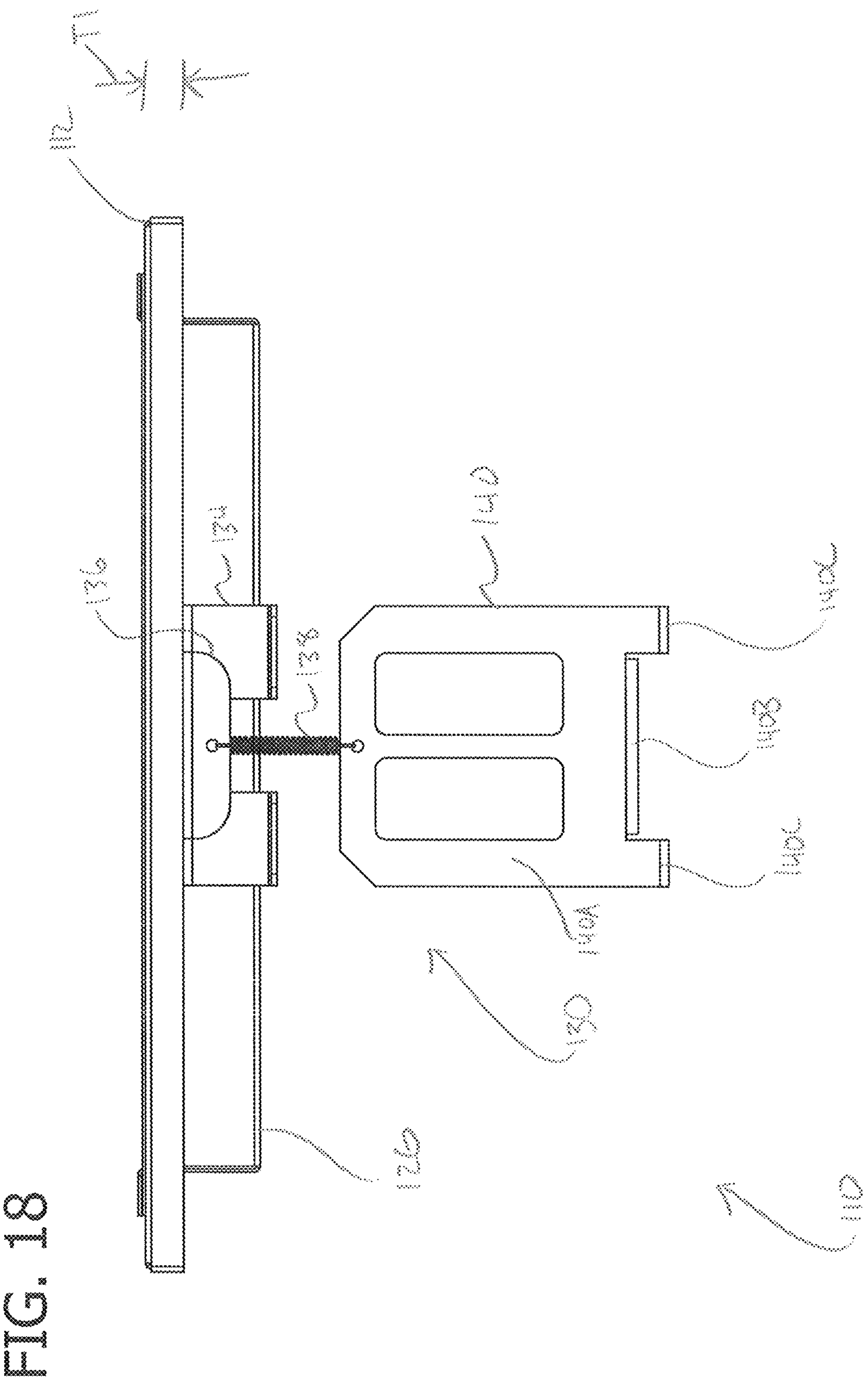
FIG. 18 is a front elevation of the workstation of FIG. 13.
Figure 19:
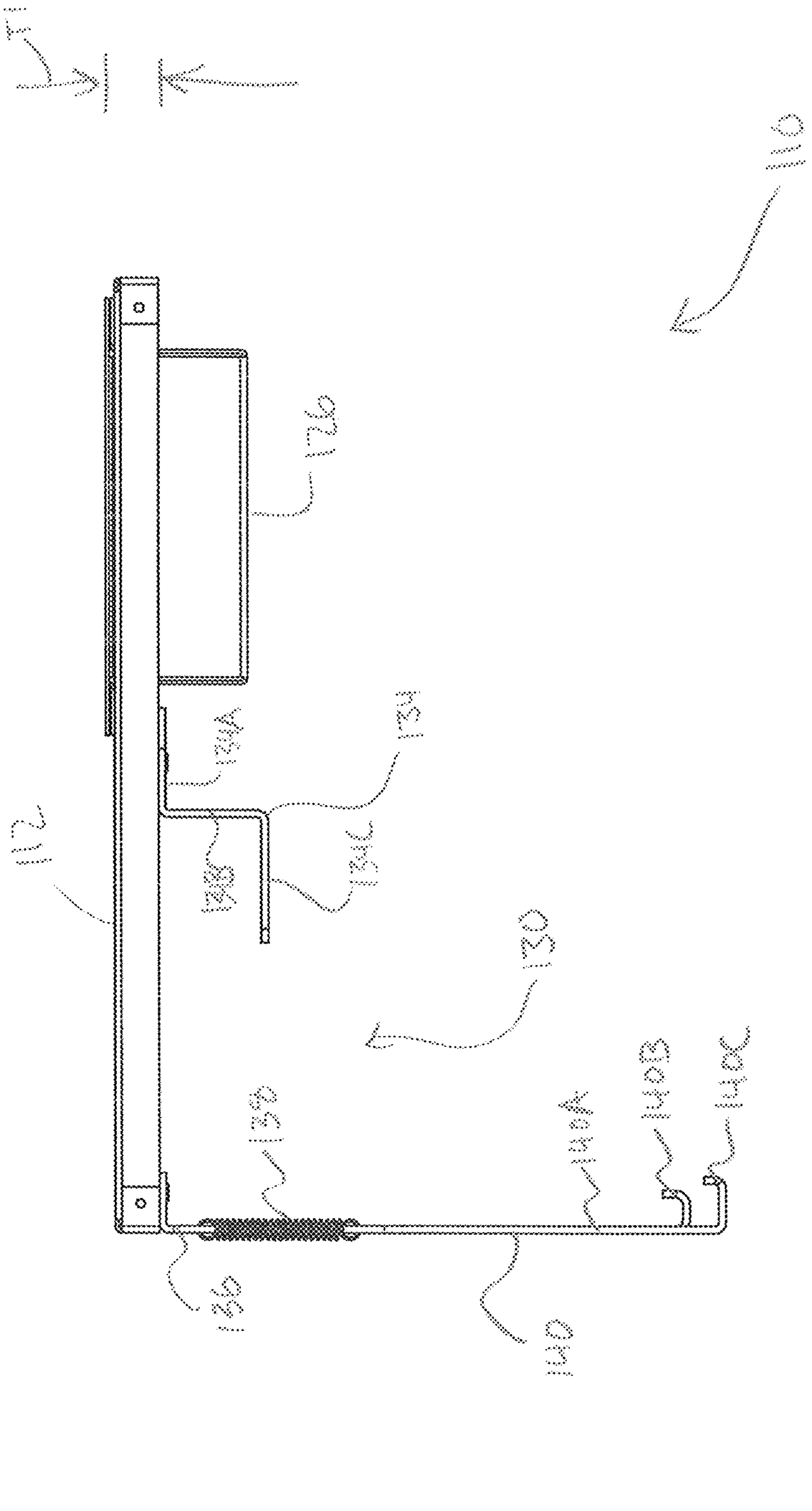
FIG. 19 is a right side elevation of the workstation of FIG. 13.
Figure 20:
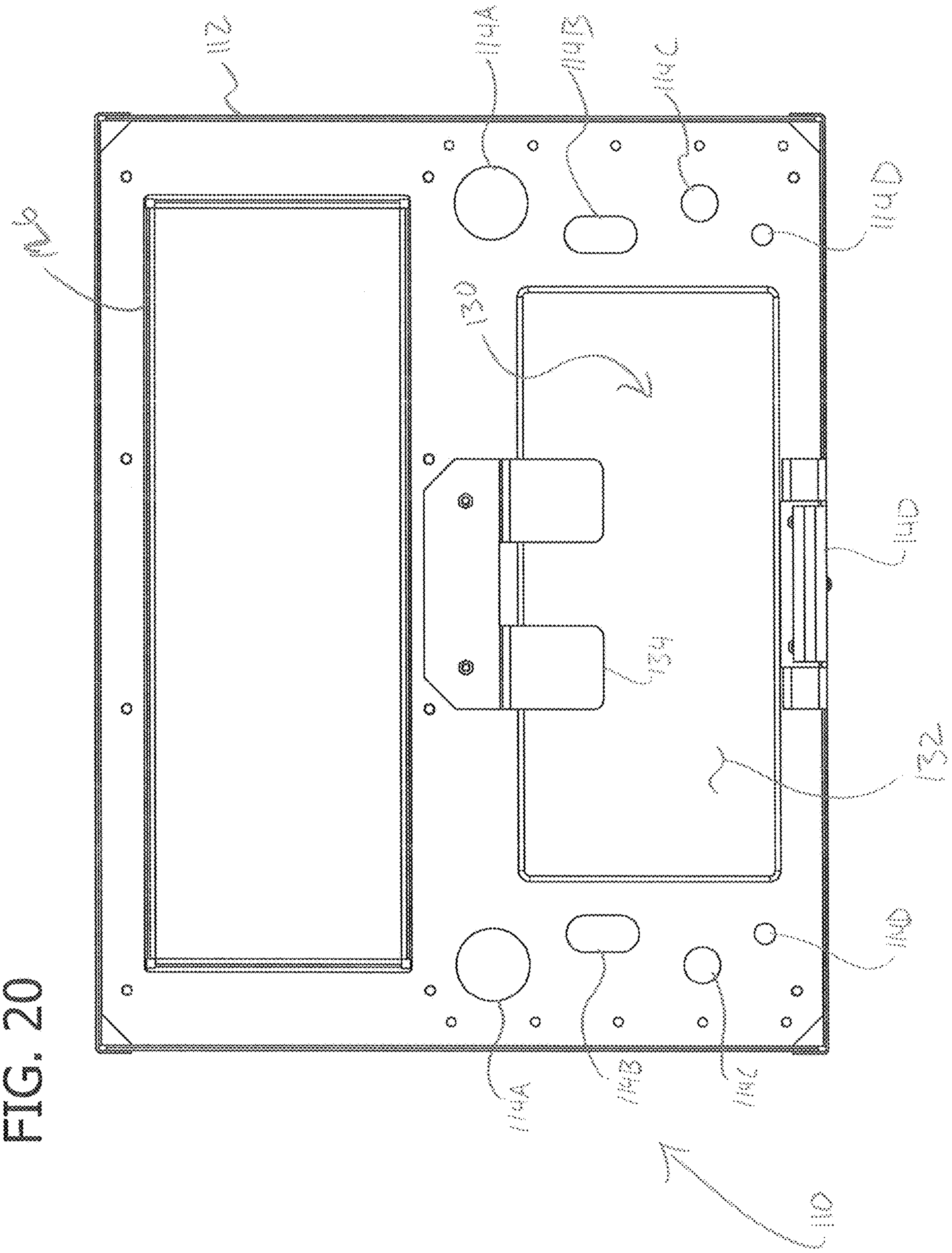
FIG. 20 is a bottom plan view of the workstation of FIG. 13.

Referring to FIGS. 13-21 and 23, the illustrated workstation 110 includes a ladder mount, generally indicated at 130, for mounting the workstation on a top end portion of the folding step ladder L (FIG. 13). The ladder mount 130 includes a large rectangular mounting hole 132 that extends through the thickness T2 of the base plate 112 adjacent the front end of the base plate (e.g., between the two lines of holes 114A-114D). The ladder mounting hole 132 is sized and arranged for receiving the top end portion of a folding step ladder L so that an inner perimeter edge margin of the base plate 112 that defines the hole 132 is seated on the step ladder. As shown in FIGS. 16 and 19, the ladder mount 130 also includes rectilinear serpentine mounting bracket 134. The mounting bracket 134 includes a top segment 134A that is attached to the base plate 112 and extends forward from a rear end to a front end adjacent the rear edge of the mounting hole 132, two laterally spaced apart middle segments 134B that extend downward from the front end of the top segment, and two laterally spaced apart bottom segments 134C that extend forward from a bottom end of the middle segment to a free end disposed beneath the mounting hole. Thus, the mounting bracket 134 is mounted centrally on the bottom surface of the base plate 112 so that the bottom segments 134C extend forward underneath the mounting hole 132 in spaced apart relationship with the bottom of the base plate 112. The bottom segments 134C are configured to hook under and engage the underside of a top rung of the ladder L received in the mounting hole 132 so that the work station 110 grips the ladder in use.

The ladder mount 130 also includes a right angle bracket 136 that is mounted on the bottom of the base plate 112 adjacent the front end, in front of the mounting hole 132. A top segment of the right angle bracket 136 is attached to the base plate 112 and a bottom segment extends downward from a front end thereof. The bottom segment of the right angle bracket 136 defines a hole for receiving an end portion of a tensioner 138, described in further detail below. Thus, the right angle bracket 136 functions as a connector configured to connect the base plate 112 and the tensioner 138.

Figure 22:
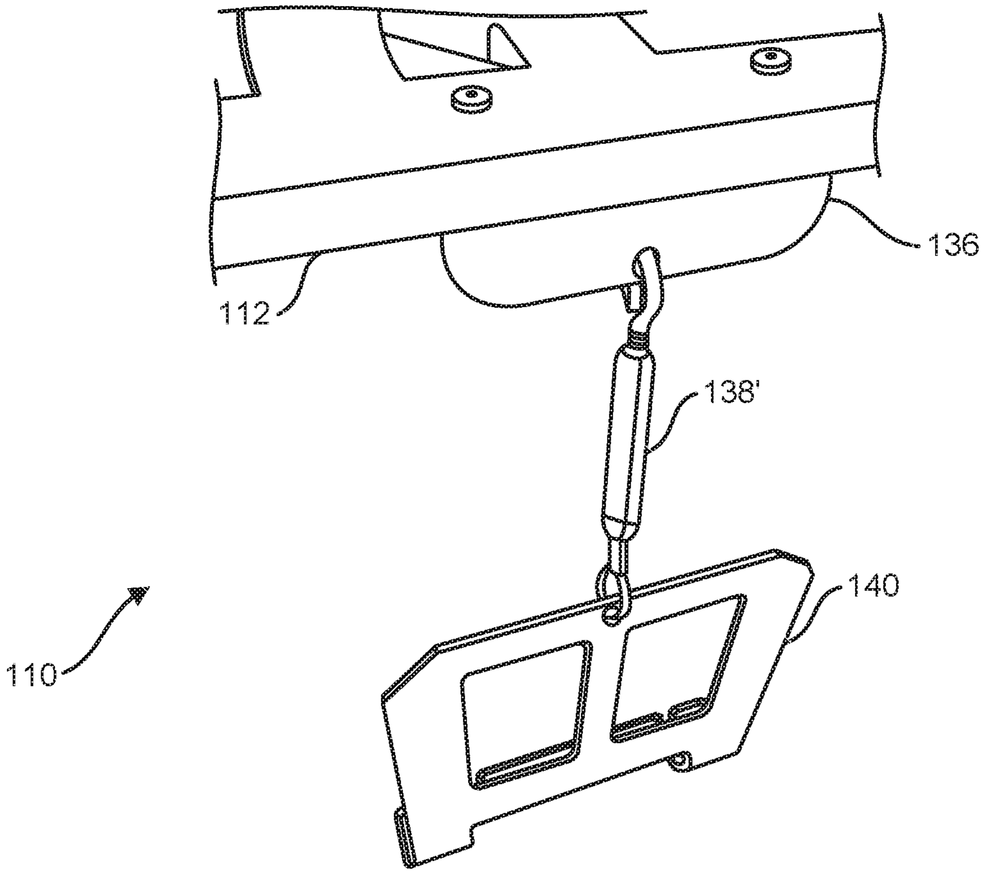
FIG. 22 is a fragmentary perspective of a workstation, similar to the workstation of FIG. 13, illustrating a turnbuckle tensioner thereof.

In the embodiment shown in FIGS. 13-21, the tensioner 138 is a coiled extension spring that tends to resiliently contract when held in axial tension. In another embodiment illustrated in FIG. 22, the coil spring tensioner 138 is replaced with a turnbuckle tensioner 138' that is likewise configured to be selectively tensioned. In each case, the first end of the tensioner 138, 138' is attached to the right angle bracket 136 and the opposite second end of the tensioner is attached to a hook member 140. As explained below, the hook member 140 is configured to be secured to a rung (hereinafter, a lower rung) of the ladder L that is spaced apart below the top of the ladder. In the case of the spring tensioner 138, the hook member 140 must be pulled downward against the force of the spring (i.e., the spring must be elongated) to be secured to the lower rung. Thus, once the hook member 140 is secured to the lower rung, the spring 138 imparts a mounting force on the base plate 112 (through the right angle bracket 136) and the hook member 140 that urges the hook member and base plate toward one another by forcing the base plate downward into tighter engagement with the top portion of the ladder L and forcing the hook member 140 upward into tighter engagement with the lower rung. Similarly, in the case of the turnbuckle tensioner 138', after the base plate 112 is received over the top end portion of the ladder L and the hook member 140 is operatively engaged with the lower rung of the ladder, the turnbuckle is tightened to create tension in the tensioner. The tension in the turnbuckle 138' imparts a mounting force that, like the mounting force imparted by the spring 138, urges the base plate 112 and the hook member 140 toward one another by simultaneously forcing the base plate downward into tighter engagement with the top portion of the ladder L and forcing the hook member upward into tighter engagement with the lower rung. As compared with the spring 138, the turnbuckle tensioner 138' is thought to be capable of creating a more rigid connection between the workstation 110 and the ladder L.

In the illustrated embodiment, the hook member 140 is formed from a rigid metal plate that is cut and bent to shape. The hook member 140 has a top portion 140A that is substantially planar and is oriented substantially vertically when the workstation 110 is mounted on the ladder L. The bottom end portion of the hook member 140 includes a middle hook segment 140B and opposite first and second outer hook segments 140C. The outer hook segments 140C are spaced apart below the middle hook segment 140B and project inward a greater distance than the middle hook segment (FIGS. 16 and 19). The hook segments 140B, 140C may be used to grip ladder rungs of differing shapes. For example, the bottom portion of a ladder rung may be received in only the middle hook segment 140B or may be received in the outer hook segments 140C, between the inward facing surface of the upwardly projecting portion thereof and the outward facing surface of the upwardly projecting portion of the middle hook segment. Other arrangements for securing the hook segments 140C, 140B to the lower rung of a ladder may be used without departing from the scope of the invention. Moreover, in other embodiments, the mounting bracket may have other shapes and configurations without departing from the scope of the invention.

To use the workstation 110, a user loads the tray 126 with work articles and places any desired tools into the tool holes 114A-114D. As above, the workstation 110 may include multiple trays 126 of different storage configurations and/or that are preloaded with different work articles such that the user can remove a tray 126 that is presently installed in the tray opening 116 and replace it with another tray as desired. When the desired tray 126 and work articles are installed in the base plate 112, the user can mount the workstation 110 on the ladder L. The top end portion of the ladder L is inserted through the mounting hole 132 until the interior perimeter edge margin of the base plate 112 is seated against the ladder. Subsequently, the user hooks the hook member 140 around the lower rung of the ladder L and uses the tensioner to impart a mounting force between the hook member and the base plate 112 as described above.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A workstation for supporting work articles at an elevated position, the workstation comprising:

a base plate configured to support the work articles having a top, a bottom, and a thickness extending therebetween, the base plate including an inner perimeter edge margin that defines a ladder opening extending through the thickness of the base plate, the ladder opening being sized and arranged for receiving a top end portion of a folding ladder therein such that the inner perimeter edge margin of the base plate is seated on the top end portion of the ladder; and a workstation mount attached to the base plate and configured to selectively secure the workstation to the ladder, the work station mount comprising:

a hook member configured for hooking engagement with a bottom portion of a rung of the ladder that is spaced apart below said top end portion of the ladder; and a tensioner connected between the hook member and the base plate and configured to be selectively tensioned to impart a mounting force between the hook member and the base plate that urges the hook member and the base plate toward one another, whereby the tensioner forces the base plate downward to maintain said seated engagement between the inner perimeter edge margin of the base plate and the top end portion of the ladder and forces the hook member upward to maintain said hooking engagement with said rung of the ladder.

2. A workstation as set forth in claim 1 wherein the tensioner comprises a turnbuckle.

3. A workstation as set forth in claim 1 wherein the workstation mount further comprises a mounting bracket attached to the base plate and including a segment configured to hook beneath a top rung of the ladder when the ladder opening receives the top end portion of the ladder therein.

4. The workstation of claim 1 wherein the ladder opening extending through the thickness of the base plate is rectangular.

5. A workstation for supporting work articles at an elevated position, the workstation comprising:

a base plate having a top, a bottom, and a thickness extending therebetween, the base plate defining a plurality of tool holes extending through the thickness of the base plate, the tool holes each being shaped and arranged for receiving a narrow end portion of a tool therethrough such that a wide end portion of the respective tool is supported on the top of the base plate, the base plate further defining at least one tray opening extending through the thickness of the base plate;

a workstation mount connected to the base plate and configured to selectively mount the workstation on a ladder; and at least one tray sized and arranged for being inserted into the at least one tray opening and thereby installed in the workstation, the at least one tray being selectively removable from the tray opening to separate the tray from the base plate;

wherein the base plate further comprises an inner perimeter edge margin that defines a ladder opening extending through the thickness of the base plate, the ladder opening being sized and arranged for receiving a top end portion of a folding ladder such that the inner perimeter edge margin of the base plate is seated on the top end portion of the ladder.

6. The workstation of claim 5 wherein the ladder opening extending through the thickness of the base plate is rectangular.

* * * * *